US007874204B2

(12) United States Patent
Odendall

(10) Patent No.: US 7,874,204 B2
(45) Date of Patent: Jan. 25, 2011

(54) METHOD FOR DETERMINING A CORRECTION VALUE FOR THE LAMBDA CENTER POSITION IN THE CONTROL OF AN INTERNAL COMBUSTION ENGINE

(75) Inventor: Bodo Odendall, Lenting (DE)

(73) Assignee: Audi AG, Irgolstadt (DE)

( * ) Notice: Subject to any disclaimer, the term of this patent is extended or adjusted under 35 U.S.C. 154(b) by 406 days.

(21) Appl. No.: 12/109,232

(22) Filed: Apr. 24, 2008

(65) Prior Publication Data

US 2008/0319634 A1 Dec. 25, 2008

(30) Foreign Application Priority Data

Apr. 26, 2007 (DE) ...................... 10 2007 019 737

(51) Int. Cl.
*G01M 15/10* (2006.01)

(52) U.S. Cl. .................................. 73/114.72; 73/23.32

(58) Field of Classification Search ................ 73/23.31, 73/23.32, 114.69, 114.71, 114.72, 114.73
See application file for complete search history.

(56) References Cited

U.S. PATENT DOCUMENTS 5,323,635 A * 6/1994 Ueno et al. ................ 73/23.32
7,725,280 B2 * 5/2010 Odendall .................... 702/104
2010/0037683 A1 * 2/2010 Barnikow et al. ........ 73/114.72

* cited by examiner

*Primary Examiner*—Eric S McCall
(74) *Attorney, Agent, or Firm*—Novak Druce + Quigg

(57) ABSTRACT

In a method for determining a correction value λk for the lambda center position λm which is specified in the control of the air/fuel ratio which is force-modulated between a first lean lambda value λ1 and a second rich lambda value λ2 and supplied to an internal combustion engine or a catalyst, using the signal from a binary jump sensor downstream from a catalyst volume, and whenever the jump sensor signal Uλ jumps from "lean" to "rich" or from "rich" to "lean" the air/fuel ratio is switched back and forth between the lean lambda value λ1 and the rich lambda value λ2, it is proposed that the time period between two signal jumps Uλ, which indicates the residence time T1 in the lean phase or the residence time T2 in the rich phase, is determined, and the correction value λk is determined from the first lean lambda value λ1, the second rich lambda value λ2, the first residence time T1, and the second residence time T2. According to the proposal, a particularly simple yet accurate method is provided for determining the correction value λk for the lambda center position λm.

7 Claims, 3 Drawing Sheets

METHOD FOR DETERMINING A CORRECTION VALUE FOR THE LAMBDA CENTER POSITION IN THE CONTROL OF AN INTERNAL COMBUSTION ENGINE

CROSS-REFERENCE TO RELATED APPLICATIONS

This application claims priority from German Patent Application No. 019737.5 filed on Apr. 26, 2007, the entire disclosures of which are hereby incorporated by reference.

The present invention relates to a method for determining a correction value for the lambda center position which is specified in the control of the air/fuel ratio which is force-modulated between a first lean lambda value and a second rich lambda value and supplied to an internal combustion engine or a catalyst, using the signal from a binary jump sensor downstream from a catalyst volume, and whenever the signal from the binary jump sensor jumps from "lean" to "rich" or from "rich" to "lean" the air/fuel ratio is switched back and forth between the first lean lambda value and the second rich lambda value.

BACKGROUND OF THE INVENTION

To allow optimal use to be made of the options for an exhaust gas catalyst which converts the pollutants emitted from internal combustion engines, in particular hydrocarbons (HC), carbon monoxide (CO), and nitrogen oxides ($NO_x$), it is advantageous for the air/fuel ratio supplied to the internal combustion engine to be modified slightly about the lambda value 1.00. However, this requires that the control of the modulation actually specifies a correct average lambda value, or optionally, that a correction value is determined and the average lambda value used is correspondingly adapted.

A method is known from DE 102 20 336 A1 for operating an internal combustion engine equipped with a three-way catalyst, whereby in a forced excitation the lambda value of the air/fuel mixture is cyclically controlled to a rich and a lean setpoint value, and the rich phases and the lean phases are balanced with one another with regard to the quantity of oxygen stored in the catalyst or with regard to the air mass.

In light of the foregoing, the object of the present invention is to provide the simplest possible yet accurate method for determining a correction value for the lambda center position in the control of an internal combustion engine.

SUMMARY OF THE INVENTION

This object is achieved by the fact that the time period between two jumps in the signal from the binary jump sensor, which indicates the residence time in the lean phase or the residence time in the rich phase, is determined, and the correction value for the lambda center position specified by the control system is determined from the first lean lambda value, the second rich lambda value, the first residence time, and the second residence time. As a result of the jump sensor being situated downstream from a catalyst volume, the residence time in the lean phase or the residence time in the rich phase is a function of the oxygen storage capacity (OSC) of the catalyst and the loading or discharge of oxygen in the catalyst, i.e., the exhaust gas mass flow and the deviation from lambda equal to 1. Thus, the correction value for the lambda center position in the control of the internal combustion engine may be calculated when the oxygen storage capacity (OSC), the exhaust gas mass flow, and the residence times are known. Since the loading of oxygen into the oxygen reservoir of the catalyst must equal the discharge of oxygen from the oxygen reservoir, the correction value may even be obtained directly from a comparison of the residence times with the deviations of the first or second lambda values from an actual lambda equal to 1.00. This is because the areas defined by the residence times and the deviations of the lambda values have the same magnitude.

In the determination of the correction value for the lambda center position, it is advantageous to hold the exhaust gas mass constant. This greatly simplifies the determination of the correction value.

Alternatively, in the determination of the correction value for the lambda center position the change in the exhaust gas mass over time is determined and taken into account. As a result of the changing exhaust gas mass, the loading or discharge of oxygen, and thus the residence time in the lean phase or in the rich phase, respectively, is influenced by the course of the exhaust gas mass.

It is advantageous that the first lean lambda value and the second rich lambda value specified by the control system each deviate from the specified lambda center position by the same amount. This corresponds to a standard forced modulation of the air/fuel ratio, and also simplifies the calculation of the correction value. In the ideal case of a correctly specified average lambda value, the residence times in the rich phase and in the lean phase are equal, and as a result of a shift of the specified lambda center position the residence time in the lean phase and the residence time in the rich phase are shifted as well.

It is particularly advantageous when the first lean lambda value and the second rich lambda value each differ from the specified lambda center position by the same amount, and the difference between the first lean lambda value and the second rich lambda value is used in the determination of the correction value for the lambda center position. By use of this measure, any inaccuracies occurring in the signal detection by the lambda probe are corrected in the evaluation.

The evaluation may be easily performed as follows, by comparing the area defined by the first lean lambda value λ1 and the residence time T1 in the lean phase with the area defined by the second rich lambda value λ2 and the residence time T2 in the rich phase. The following equations may be used for this purpose:

$$\Delta\lambda = |\lambda 1 - \lambda m| = |\lambda 2 - \lambda m|$$

$$\frac{T2}{T1 + T2} = \frac{\Delta\lambda + \lambda k}{2 \cdot \Delta\lambda}$$

$$\lambda k = \left(\left(\frac{T2}{T1 + T2}\right) 2 \cdot \Delta\lambda\right) - \Delta\lambda$$

or $$\Delta\lambda = |\lambda 1 - \lambda m| = |\lambda 2 - \lambda m|$$

$$\frac{T1}{T1 + T2} = \frac{\Delta\lambda - \lambda k}{2 \cdot \Delta\lambda}$$

$$\lambda k = \left(\left(-\frac{T1}{T1 + T2}\right) 2 \cdot \Delta\lambda\right) + \Delta\lambda$$

When it is determined by means of the method according to the invention that the correction value λk for the lambda center position λm specified by the control system is not zero, the lambda center position is correspondingly adapted to the actual lambda equal to 1.00 to ensure optimal use of the oxygen reservoir, and thus the conversion capacity of the catalyst.

BRIEF DESCRIPTION OF THE DRAWINGS

The present invention is explained in greater detail with reference to the following drawing figures, which show the following.

DETAILED DESCRIPTION OF PREFERRED EMBODIMENT OF THE INVENTION

Each pair of FIGS. 1*a* and 1*b*, FIGS. 2*a* and 2*b*, and FIGS. 3*a* and 3*b* shows, with the exhaust gas mass m held constant, an actual air/fuel ratio which is force-modulated symmetrically with respect to an assumed lambda center position λm between a first lean lambda value λ1 and a second rich lambda value λ2, and in synchronization therewith, the voltage signal Uλ from a binary jump sensor downstream from the catalyst or at least a partial volume of the catalyst. A comparison of the pairs of diagrams in the figures clearly shows that every two adjacent jumps or peaks of the voltage signal Uλ from the jump sensor delimit the residence time T1 in the lean phase or the residence time T2 in the rich phase. The forced modulation based on the sensor signal Uλ, which results in switching of the air/fuel ratio back and forth approximately once per second, is also referred to as natural frequency control.

Figure 1A:
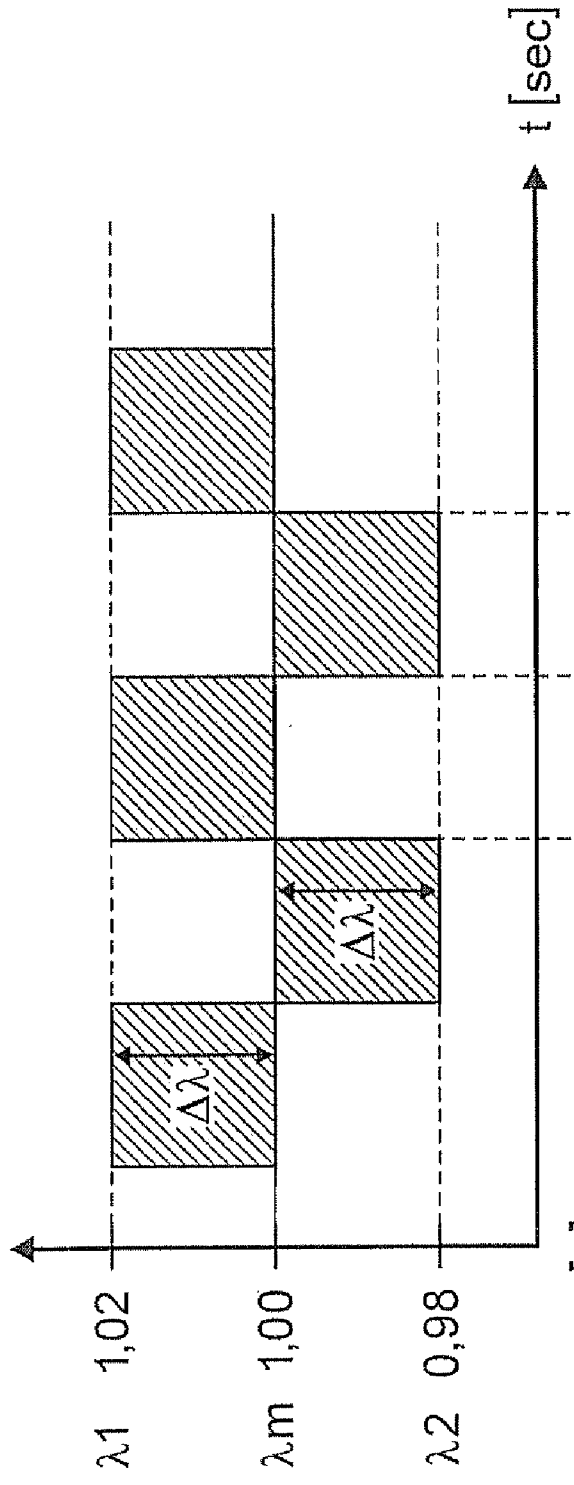
FIGS. 1*a* and 1*b* show a diagram of the lambda value specified by the control system over time at the correct lambda center position, and an analogous diagram of the voltage signal from the jump sensor over time.
Figure 1B:
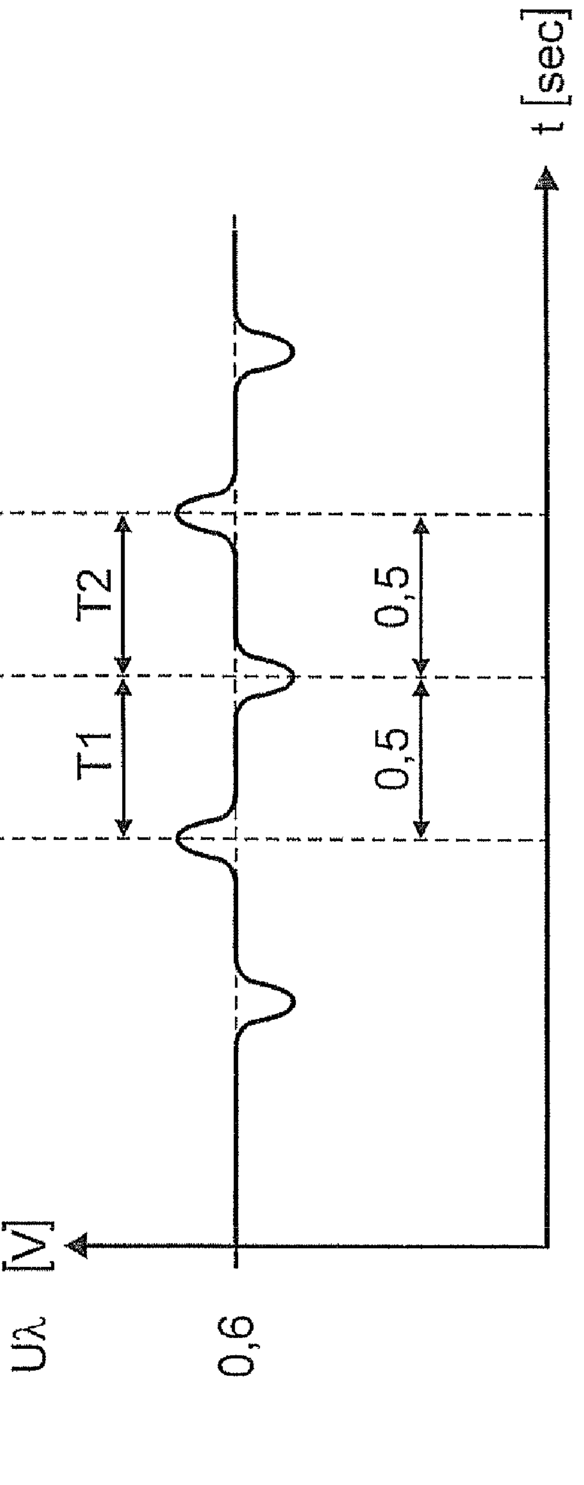

The first case in FIGS. 1*a* and 1*b* shows that in the ideal case of a correct lambda center position λm=1.00, the first lean lambda value λ1=1.02 and the second rich lambda value λ2=0.98 are actually positioned symmetrically with respect to lambda λ=1.00, and correspondingly, the residence time T1=0.5 sec in the lean phase and the residence time T2=0.5 sec in the rich phase have the same length; i.e., T1=T2. This is represented by the "mirroring" of the square areas illustrated in crosshatch.

$$\Delta\lambda = |\lambda 1 - \lambda m| = |\lambda 2 - \lambda m|$$

$$\Delta\lambda = 0.02$$

$$\lambda k = \left(\left(\frac{T2}{T1 + T2}\right)2 \cdot \Delta\lambda\right) - \Delta\lambda$$

$$\lambda k = \left(\left(\frac{0,5}{0,5 + 0,5}\right)2 \cdot 0,02\right) - 0,02$$

$$\lambda k = 0$$

It follows that in the present case, the average lambda value λ specified by the control system of the internal combustion engine corresponds exactly to the actual lambda equal of 1.00; i.e., the correction value λk in this case is equal to 0.

Figure 2A:
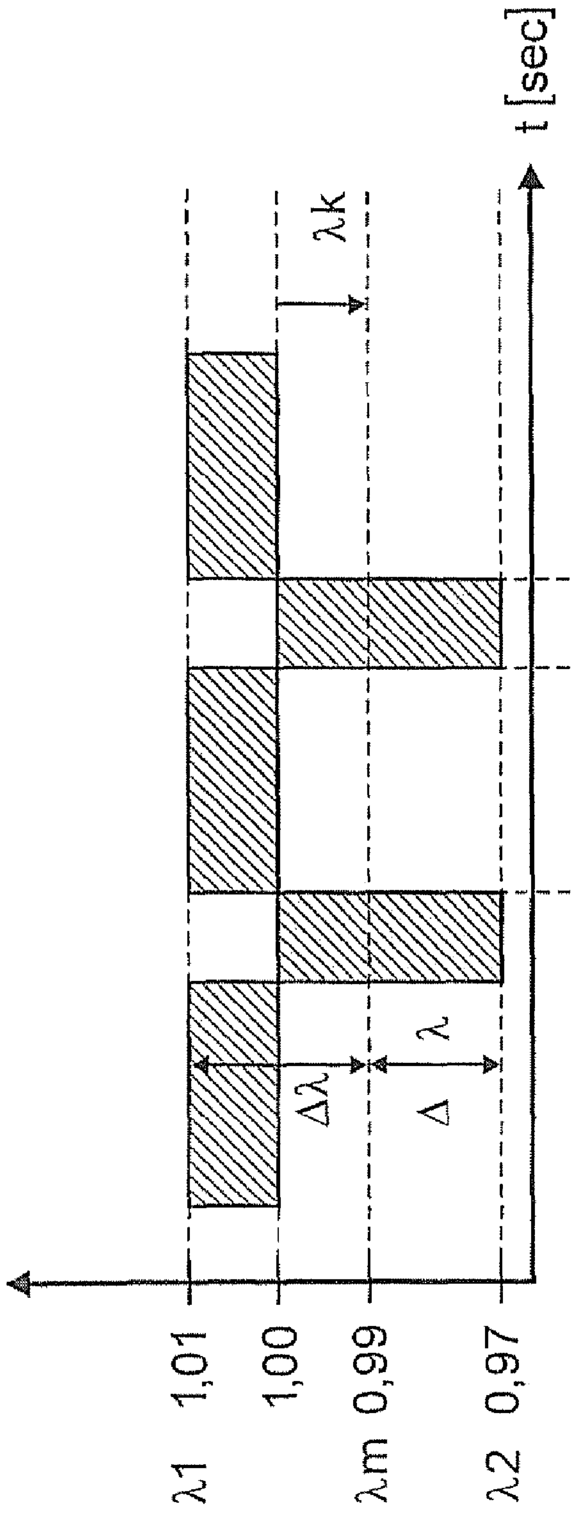
FIGS. 2*a* and 2*b* show a diagram of the lambda value specified by the control system when the lambda center position is too low, and an analogous diagram of the voltage signal from the jump sensor over time.
Figure 2B:
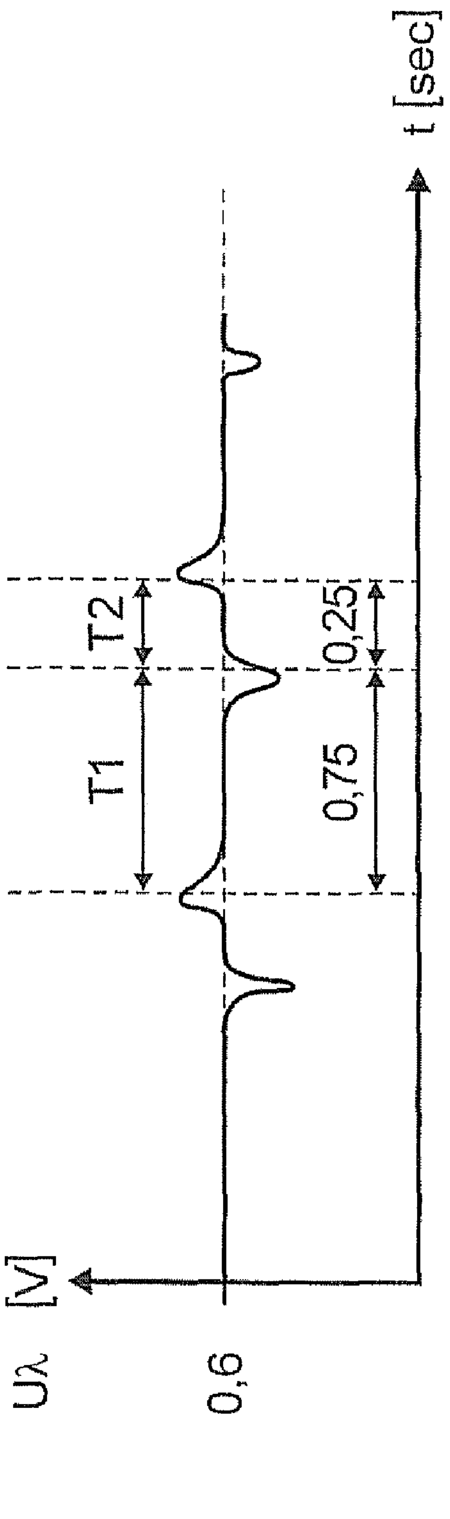

In contrast, the second case from FIGS. 2*a* and 2*b* shows that when the lambda center position λm=0.99 is too low, i.e., too rich, the first lean lambda value λ1=1.01 and the second rich lambda value λ2=0.97 are no longer positioned symmetrically with respect to lambda λ=1.00, and correspondingly, the residence time T1=0.75 in the lean phase is greater than the residence time T2=0.25 in the rich phase in order to achieve equal loading and discharge of oxygen in the oxygen reservoir of the catalyst.

$$\Delta\lambda = |\lambda 1 - \lambda m| = |\lambda 2 - \lambda m|$$

$$\Delta\lambda = 0.02$$

$$\lambda k = \left(\left(\frac{T2}{T1 + T2}\right)2 \cdot \Delta\lambda\right) - \Delta\lambda$$

$$\lambda k = \left(\left(\frac{0,25}{0,75 + 0,25}\right)2 \cdot 0,02\right) - 0,02$$

$$\lambda k = -0.01$$

The above calculation results in a correction value λk of −0.01, which is used to adapt the specified average lambda value λm toward the lean region of lambda λ=1.00.

Figure 3A:
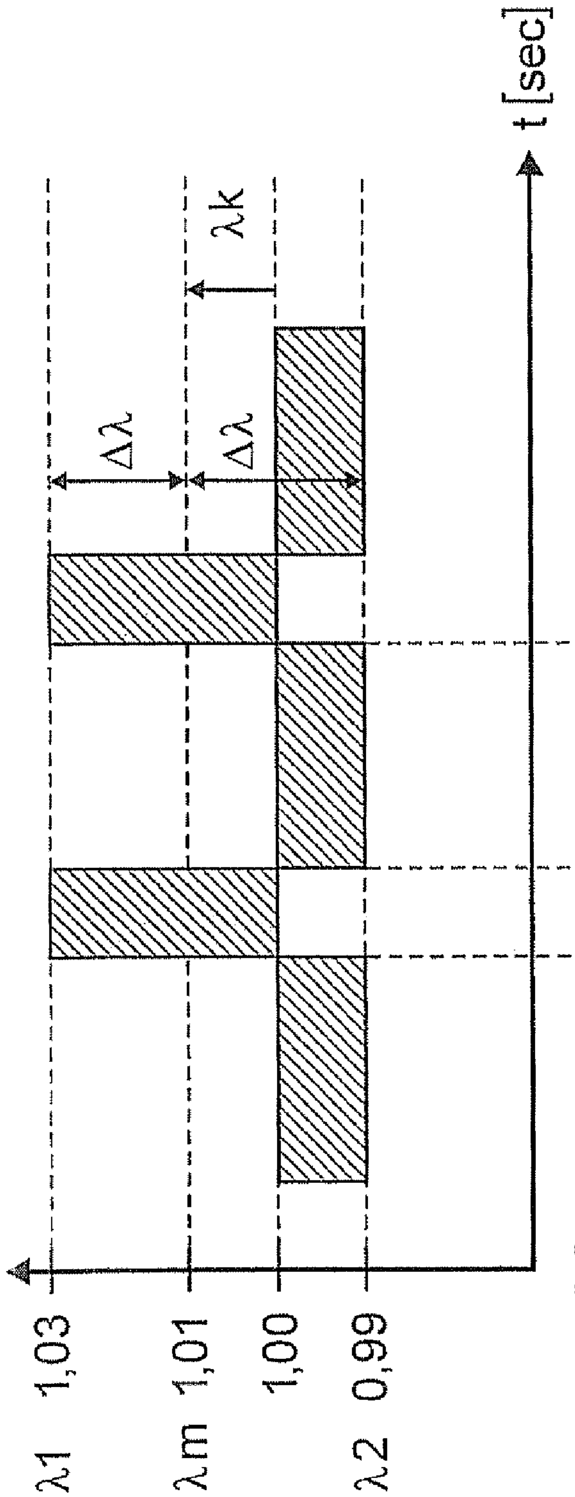
FIGS. 3*a* and 3*b* show a diagram of the specified lambda value when the lambda center position is too high, and an analogous diagram of the signal from the jump sensor over time.
Figure 3B:
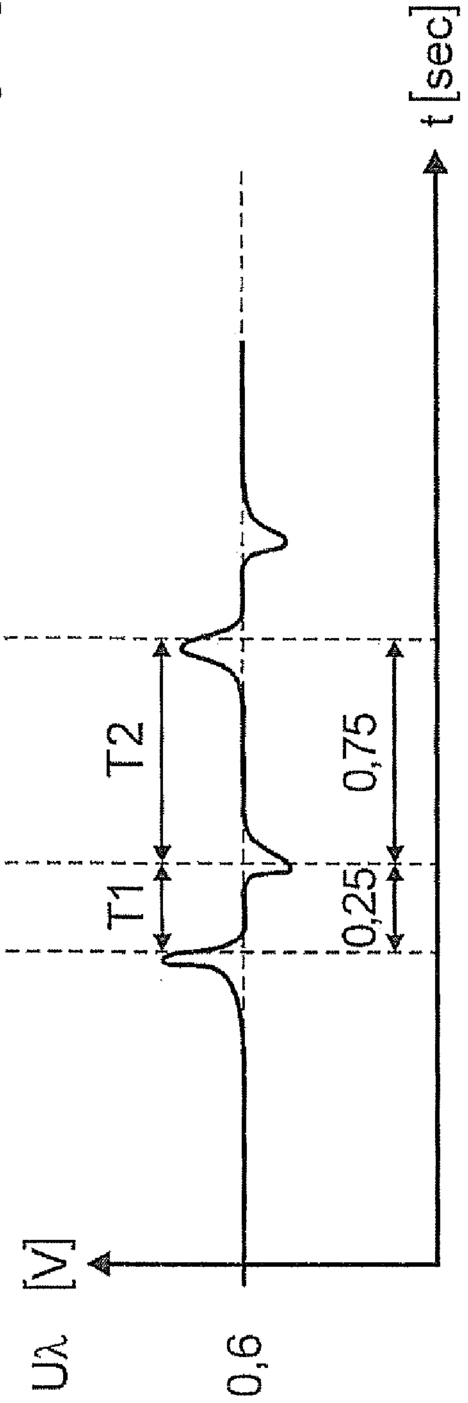

Lastly, the third case of FIGS. 3*a* and 3*b* show that when the lambda center position λm=1.01 is too high, i.e., too lean, the first lambda value λ1=1.03 and the second lambda value λ2=0.99 are no longer positioned symmetrically with respect to lambda λ=1.00, and correspondingly, the residence time T1=0.25 in the lean phase is less than the residence time T2=0.75 in the rich phase, so that equal loading and discharge of oxygen can still take place.

$$\Delta\lambda = |\lambda 1 - \lambda m| = |\lambda 2 - \lambda m|$$

$$\Delta\lambda = 0.02$$

$$\lambda k = \left(\left(\frac{T2}{T1 + T2}\right)2 \cdot \Delta\lambda\right) - \Delta\lambda$$

$$\lambda k = \left(\left(\frac{0,75}{0,25 + 0,75}\right)2 \cdot 0,02\right) - 0,02$$

$$\lambda k = +0.01$$

This results in a correction value λk of +0.01. The average lambda center position λm is then correspondingly adapted toward the rich region of lambda λ=1.00.

LIST OF REFERENCE CHARACTERS m Exhaust gas mass
dm/dt Change in the exhaust gas mass over time
λm Lambda center position
λ1 First lean lambda value
λ2 Second rich lambda value
λk Correction value for λm
Δλ Magnitude of deviation between λ1 and λm or λ2 and λm
Uλ Voltage signal
T1 Residence time in the lean phase
T2 Residence time in the rich phase

The invention claimed is:

1. Method for determining a correction value for the lambda center position which is specified in the control of the air/fuel ratio which is force-modulated between a first lean lambda value and a second rich lambda value and supplied to an internal combustion engine or a catalyst, using the signal from a binary jump sensor downstream from a catalyst volume, and whenever the signal from the binary jump sensor jumps from "lean" to "rich" or from "rich" to "lean" the air/fuel ratio is switched back and forth between the first lean lambda value and the second rich lambda value, wherein the time period between two jumps in the signal (Uλ), which indicates the residence time (T1) in the lean phase or the residence time (T2) in the rich phase, is determined, and the correction value (λk) for the lambda center position (λm) specified by the control system is determined from the first lean lambda value (λ1),
the second rich lambda value (λ2),
the first residence time (T1), and
the second residence time (T2).

2. The method according to claim 1 wherein during the determination of the correction value (λk) for the lambda center position (λm) the exhaust gas mass (m) is held constant.

3. The method according to claim 1 wherein during the determination of the correction value (λk) for the lambda center position (λm) the change in the exhaust gas mass over time (dm/dt) is determined and taken into account.

4. The method according to claim 1 wherein the first lean lambda value (λ1) and the second rich lambda value (λ2) specified by the control system each deviate from the specified lambda center position (λm) by the same amount (Δλ).

5. The method according to claim 1 wherein the difference (2·Δλ) between the first lean lambda value (λ1) and the second rich lambda value (λ2) is used in the determination of the correction value (λk) for the lambda center position (λm).

6. The method according to claim 1 wherein when the correction value (λk) for the lambda center position (λm) specified by the control system is not zero, the specified lambda center position (λm) is correspondingly adapted.

7. the method according to claim 1 wherein the correction value (λk) for the lambda center position (λm) is derived by the formula:

$$\lambda k = 2\Delta\lambda\left(\frac{T1}{T1 + T2}\right) - \Delta\lambda$$

wherein Δλ is the magnitude of deviation between a first lean lambda value (λ1) and the lambda center position (λm) or a sound rich lambda value (λ2) and the lambda center position (λm), T1 is the residence time in the lean phase and T2 is the residence time in the rich phrase.

* * * * *